No. 885,521. PATENTED APR. 21, 1908.
A. M. REMINGTON.
HANDSAW.
APPLICATION FILED JAN. 28, 1908.
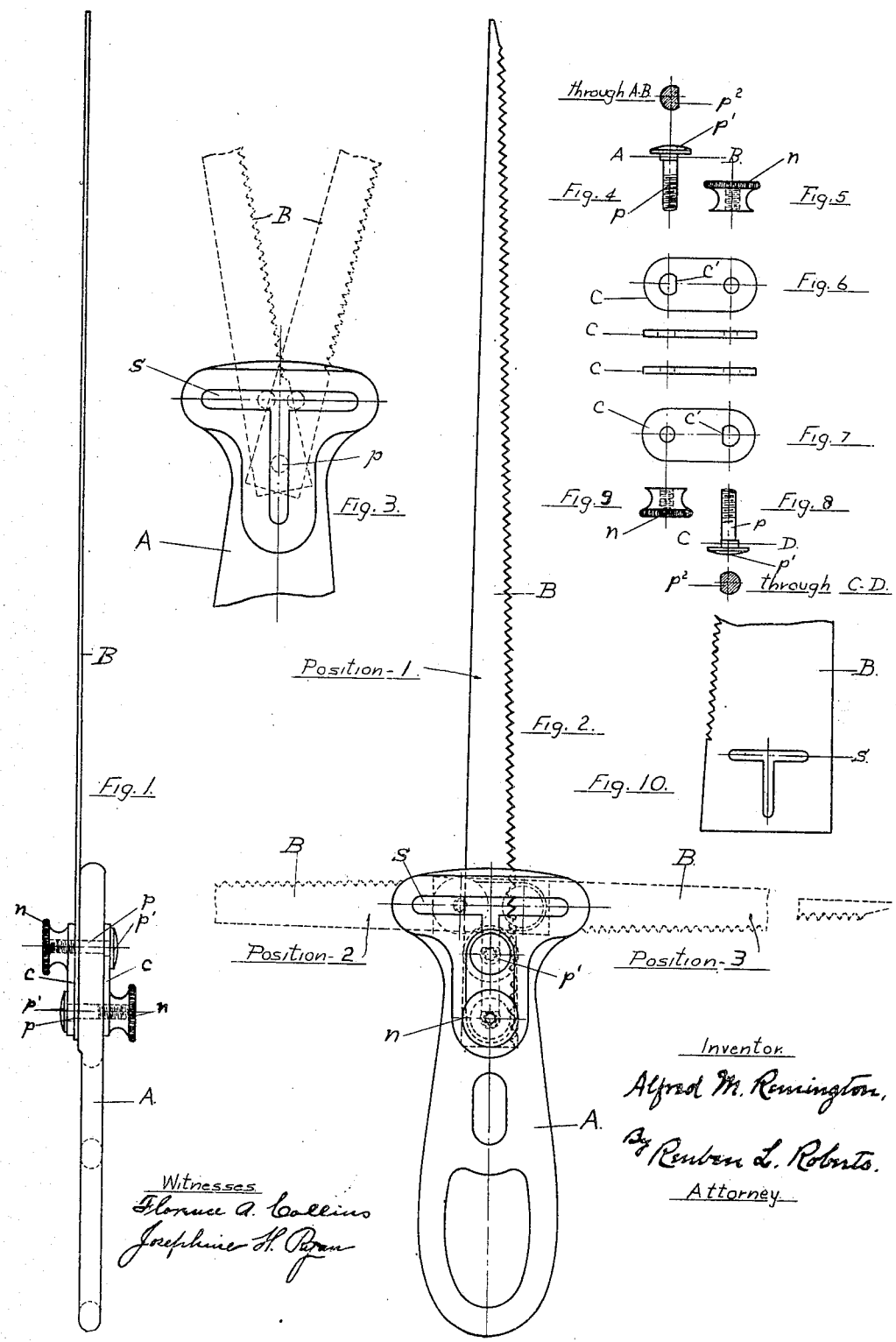

UNITED STATES PATENT OFFICE.

ALFRED M. REMINGTON, OF FITCHBURG, MASSACHUSETTS, ASSIGNOR TO SIMONDS MANUFACTURING CO., OF FITCHBURG, MASSACHUSETTS, A CORPORATION OF MASSACHUSETTS.

HANDSAW.

No. 885,521.      Specification of Letters Patent.      Patented April 21, 1908.

Application filed January 28, 1908. Serial No. 412,962.

*To all whom it may concern:*

Be it known that I, ALFRED M. REMINGTON, a citizen of the United States of America, residing at Fitchburg, in the county of Worcester and State of Massachusetts, have invented certain Improvements in Handsaws, of which the following is a specification.

The invention relates to hand-saws in which the two members, the handle and the blade, are adjustable in relation to each other to any desired position, in a given plane, for convenience of use; and also, so that the blade may be turned from an operative position extending forward parallel with the length of the handle, to the reversed or inoperative position extending backward over the handle, where the blade will be partially protected and the saw more convenient for packing and carriage.

Heretofore in the construction of saws in which the blade and handle were relatively adjustable, one turned in relation to the other upon a pivot in a fixed position, but this invention consists of connecting slots substantially at right angles to each other formed in one of the said members, and a pair of pins attached to the other member and extending through the slots, with means upon each end of the respective pins, to retain them in the slots and hold the two members in proper relation and also adjustable means to securely clamp the two members in any position to which they are turned.

The invention can be clearly and conveniently shown in its application to what is known as a compass-saw, and such a saw is illustrated in the drawings, wherein—

Figure 1 is an edge view of such a saw with the improvements embodied therein; Fig. 2 is a side view of the same; Fig. 3 is a side view of a portion of the saw handle showing the T-shaped slot therein, and a portion of a saw blade adjusted at an angle to the length of the handle; Fig. 4 shows a side view and cross section of one of the pins which pass through the slot in the handle; Fig. 5 is one of the clamping nuts; Figs. 6 and 7 are plan and edge views of plates which are interposed between the clamping nuts and heads of the pins and the handle; Fig. 8 is a side view and section of another pin; Fig. 9 of another nut, and Fig. 10 is a side view of a portion of a saw blade having the T-shaped slot formed therein instead of in the handle.

Referring to the drawings, A is the saw handle, B the blade, S the T-shaped slot; $p, p$, are the pins which are passed through the slot S and through holes or openings in the blade B. The pins are provided with a broad flat head $p'$ upon one end and are screw-threaded at the other end, upon which a knurled nut $n$ is screwed after the pins are in place. By this means the parts are held in proper relation while the pins slide along the various portions of the slot, and when the blade has been adjusted to the desired angle with respect to the handle, the two may be clamped together by screwing the nuts $n$ tightly against the blade and handle.

For the purpose of effective operativeness and convenience, plates $c$ may be employed between the heads $p'$ and nuts $n$, and the handle and saw blade, and one side of the neck of each screw may be flattened as at $p^2$, and one side of the hole in the plate which receives that portion of the neck may be flattened as at $c'$, as indicated in Figs. 4 and 8, and 6 and 7, respectively, to prevent the pins from turning when the nuts $n$ are turned.

It will be understood that the T-shaped slot may be made in the saw-blade as shown in Fig. 10, and the pins $p$ inserted in holes in the handle and through the slot in the blade. The nuts $n$ would thus serve the same purpose, and the whole construction operate in the same manner as in that shown in Fig. 3.

In Fig. 2, the saw blade is shown in three different positions. In position 1, the saw blade is parallel with the length of the handle; in positions 2 and 3, the blade is at right angles to length of the handle upon either side. In Fig. 3 the blade is shown at an angle of about 10° to the median line of the length of the handle. The blade may also be adjusted to any other angle with such line of the handle and may be turned to the reverse position of that shown in position 1 of Fig. 2.

I claim:

1. In a saw, having the blade and handle angularly adjustable in respect to each other, connecting slots which are arranged at an angle with one another in one of the members, a pair of pins which pass through said slots and through the other member, and which may be moved as desired in the said slots, and means to clamp the two members together in any position to which they are adjusted in relation to each other.

2. In a saw, having the blade and handle angularly adjustable in relation to each other, a T-shaped slot in one of such members, a pair of pins which extend through said slot and through openings in the other member, means to hold the pins in proper relation to the members to permit the pins to be readily moved about in the slots, and means to clamp the members securely together in any position of adjustment.

ALFRED M. REMINGTON.

Witnesses:
STEPHEN J. GELLES,
WALTER D. FRENCH.